United States Patent Office 3,069,368
Patented Dec. 18, 1962

3,069,368
BINARY OIL-IN-WATER SURFACE COATING
EMULSIONS
Robert J. Carney, Saxonville, and Frank J. Hahn, Springfield, Mass., assignors to Monsanto Chemical Company, St. Louis, Mo., a corporation of Delaware
No Drawing. Filed Mar. 9, 1960, Ser. No. 13,696
17 Claims. (Cl. 260—21)

This invention relates to novel surface coating compositions. More particularly, it relates to novel oil-in-water emulsions of a binary combination of (1) fatty acid esters of copolymers of ethylenically unsaturated alcohols with styrene monomers and (2) etherified aminoplast condensates.

Surface coating compositions comprised of hydrocarbon solutions of essentially completely esterified fatty acid esters of styrene-allyl alcohol copolymers have been prepared by E. C. Shokal and P. E. Devlin; U.S. 2,588,890 and U.S. 2,630,430. However, the use of hydrocarbon solvents in large proportions precludes the application of these esterified copolymers to end uses where aqueous dispersions are required or preferred. Moreover, the esterified copolymers themselves are relatively soft and have insufficient solvent resistance for many applications, especially where rapid baking is necessary or desirable. Thus, these disadvantages combine to preclude, or limit, the application of fatty acid esters of styrene-allyl alcohol copolymers in such uses as aqueous automotive dipping primers, aqueous industrial finishes, aqueous automobile and industrial baking finishes, etc.

It is an object of this invention to provide novel surface coating compositions.

Another object is the provision of novel air drying and baking finishes.

A further object is the provision of highly adhesive, flexible and hydrolysis-resistant surface coatings of improved hardness.

These and other objects are attained by combining (1) a fatty acid ester of a copolymer of an ethylenically unsaturated alcohol and a styrene monomer, from 50–75% of the hydroxyl groups of said copolymer being so esterified and said esterified copolymer being associated with sufficient free fatty acid to possess an acid number of at least 2, but not more than 12, with (2) an etherified aminotriazine-formaldehyde condensate, (3) water, and (4) sufficient ammonia or soap-forming amine to at least completely neutralize said free fatty acid and yield a stable oil-in-water emulsion containing from 10–60% of esterified copolymer by weight.

The following examples are presented in illustration of the invention and are not intended as limitations thereon.

Example I (a) A 1-liter flask is equipped with a stirrer, a thermometer, a water condenser and a trap filled with xylene. Three-hundred and forty grams of a copolymer comprised of about 70% by weight of styrene and, correspondingly, a theoretical 30% by weight of allyl alcohol, but having an actual hydroxyl group content of about 5.9% by weight, are charged thereto together with 100 grams of lauric acid, 60 grams of soya fatty acids and 30 grams of xylene. The mixture is gradually heated to about 210° C. and maintained thereat until about 12 ml. of water have been removed by azeotropic distillation and collected in the trap. A fused esterified resin wherein approximately 50% of the hydroxyl groups have been esterified is obtained. The product is adjusted to an acid number of about 6 with soya fatty acids.

(b) Forty grams of a 65% by weight solids solution of a partial butyl ether of a melamine-formaldehyde condensate containing about 6 mols of formaldehyde per mol of melamine dissolved in a 7:1 by weight xylene-butanol mixture are charged to a 2 liter stirrer equipped flask. Ten grams of soya fatty acids are added and the batch is stirred until homogeneous. Then, a solution of 3 grams of morpholine dissolved in 35 ml. of water are charged and the batch is stirred into a homogeneous oil-in-water emulsion.

(c) Five-hundred grams of the product of (a) are charged to a one-half gallon stainless steel kettle equipped with a close-fitting anchor stirrer. The batch is heated to about 45° C. and agitation is started. After about 1 minute, 50 ml. of an aqueous ammonium hydroxide solution containing about 0.25% ammonia by weight are charged and the mixture is stirred until a smooth viscous paste is obtained (circa 25 minutes). Then an additional 285 ml. of said 0.25% aqueous ammonia solution are titrated into the stirred viscous mass over a period of about 2 hours, amid stirring, until an oil-in-water emulsion is obtained. Finally, the emulsion is titrated into the aminoplast emulsion prepared in (b) and the batch is stirred until homogeneous. The batch temperature is maintained at about 70° C. throughout. The product is a stable oil-in-water emulsion containing about 57% solids by weight.

(d) About 0.06 gram of a water-dispersible cobalt naphthenate containing about 6% $Co^{++}$ ions by weight is thoroughly blended into a 30 gram portion of the oil-in-water emulsion prepared in (c). A portion of this blended emulsion is then poured onto a clean steel plate and drawn to a uniform wet film thickness of about 0.005 inch with a doctor blade. The plate and film are oven-baked at 150° C. for about 1 hour. Upon cooling, a transparent, hard, flexible and impact resistant film is obtained. The film is resistant to water, 5% caustic solution, methanol and detergents.

Example II (a) A 1-liter flask is equipped with a stirrer, a thermometer, a water condenser and a trap filled with xylene. Three-hundred grams of a copolymer comprised of about 70% by weight of styrene and, correspondingly, a theoretical 30% by weight of allyl alcohol, but having an actual hydroxyl group content of about 6.5% by weight, are charged thereto together with 240 grams of soya fatty acids and 30 grams of xylene. The mixture is gradually heated to reflux (circa 170° C.) and then to about 225° C. over a period of 1 hour and is maintained thereat for an additional hour. About 30 ml. of mixed water and xylene are removed from the trap. The batch temperature is then increased, over a 45-minute period, to about 300° C. and is maintained thereat for an additional 2 hours. A fused esterified resin wherein approximately 75% of the hydroxyl groups have been esterified is obtained in conjunction with sufficient free soya fatty acids to provide an acid number of about 3.

(b) One-hundred grams of a 65% by weight solids xylene-butanol solution of a partial butyl ether of a benzoguanamine-formaldehyde condensate containing about 4 mols of formaldehyde per mol of benzoguanamine and modified with about 0.3 mol of toluene sulfonamide per mol of benzoguanamine are charged to a 2-liter stirrer equipped flask. Twenty-five grams of soya fatty acids are added and the batch is stirred until homogeneous. Then, a solution of 7 grams of morpholine dissolved in 90 ml. of water are charged and the batch is stirred into a homogeneous oil-in-water emulsion.

(c) Five-hundred grams of the product of (a) are charged to a one-half gallon stainless steel kettle equipped with a close-fitting anchor stirrer. The batch is heated to about 50° C. and agitation is started. After about 1 minute, 50 ml. of an aqueous ammonium hydroxide solution containing about 1.5% ammonia by weight are charged and the mixture is stirred until a smooth viscous paste is obtained (circa 15 minutes). Then an additional 50 ml. of said 1.5% aqueous ammonium hydroxide solution and 500 grams of water are simultaneously titrated into the stirred viscous mass over a period of about 2 hours until an oil-in-water emulsion is obtained. Finally, this emulsion is titrated into the aminoplast prepared in (b) and the batch is stirred until homogeneous. The batch temperature is maintained at about 50° C. throughout. The product is a stable oil-in-water emulsion containing about 44% solids by weight.

(d) About 0.06 gram of a water-dispersible cobalt naphthenate containing about 6% $Co^{++}$ by weight is thoroughly blended into a 30-gram portion of the oil-in-water emulsion preprepared in (c). A portion of this blended emulsion is then poured onto a clean steel plate and drawn to a uniform wet film thickness of about 0.005 inch with a doctor blade. The plate and film are oven-baked at 150° C. for about 1 hour. Upon cooling, a transparent, hard, flexible and impact resistant film is obtained. The film is resistant to water, 5% caustic solution, methanol and detergents.

*Example III*

Example I is repeated except that 200 grams of linseed oil fatty acids are substituted for the lauric acid and soya fatty acids employed in step (a) thereof. The new product of step (a) comprises a fused esterified resin wherein approximately 50% of the hydroxyl groups have been esterified and sufficient free linseed oil fatty acids to provide an acid number of about 3. The final product, after repeating steps (b), (c) and (d), is a hard, flexible and impact resistant film which is also resistant to such solvents as water, 5% caustic solution, methanol and detergents.

*Example IV*

Example I is repeated except that 200 grams of tall oil fatty acids are substituted for the lauric acid and soya fatty acids employed in step (a) thereof. The new product of step (a) comprises a fused esterified resin wherein approximately 50% of the hydroxyl groups have been esterified and sufficient free tall oil fatty acids to provide an acid number of about 12. The final product, after repeating steps (b), (c) and (d), is a transparent, hard, flexible and impact resistant film which is also resistant to such solvents as water, 5% caustic solution, methanol and detergents.

*Example V*

(a) A 1-liter flask is equipped as in Example I(a). Three-hundred and forty grams of a copolymer comprised of about 70% by weight of styrene and, correspondingly, a theoretical 30% by weight of allyl alcohol, but having an actual hydroxyl group content of about 6.1% by weight, are charged thereto together with 200 grams of soya fatty acids and 30 grams of xylene. The mixture is gradually heated to reflux (circa 160° C.) and then to 225° C. over a period of about 1 hour. The temperature is maintained at about 225±5° C. until about 12 ml. of water are collected in the trap. A fused esterified resin wherein approximately 60% of the hydroxyl groups have been esterified is obtained. The product is adjusted to an acid number of about 6 with linseed oil fatty acids.

(b) One-hundred grams of a 65% by weight solids xylene solution of a partial isopropyl ether of a guanamine-formaldehyde condensate containing about 4 mols of formaldehyde per mol of guanamine are charged to a 2-liter stirrer equipped flask. Twenty-five grams of soya fatty acids are added and the batch is stirred until homogeneous. Then, a solution of 6 grams of morpholine dissolved in 100 ml. of water are charged and the batch is stirred into a homogeneous oil-in-water emulsion.

(c) Five-hundred grams of the product of (a) are charged to a one-half gallon stainless steel kettle equipped with a close-fitting anchor stirrer. The batch is heated to about 40° C. and agitation is started. After about 1 minute, 100 ml. of an aqueous ammonium hydroxide solution containing about 3% ammonia by weight are charged and the mixture is stirred until a smooth viscous paste is obtained (circa 30 minutes). Then 400 ml. of a second aqueous ammonium hydroxide solution containing about 0.75% ammonia by weight are titrated into the stirred viscous mass over a period of about 2 hours until an oil-in-water emulsion is obtained. Finally, this emulsion is titrated into the aminoplast emulsion prepared in (b) and the batch is stirred until homogeneous. The batch temperature is maintained at about 70° C. throughout. The product is a stable oil-in-water emulsion containing about 45% solids by weight.

(d) About 0.06 gram of a water-dispersible cobalt naphthenate containing about 6% $Co^{++}$ by weight is thoroughly blended into a 30 gram portion of the oil-in-water emulsion prepared in (c). A portion of this blended emulsion is then poured onto a clean steel plate and drawn to a uniform wet film thickness of about 0.005 inch with a doctor blade. The film is dried in a hot air oven at about 150° C. for 30 min. A hard, transparent, flexible and impact resistant film is obtained. The film is resistant to water, 5% caustic solution, methanol and detergents.

*Example VI*

Example V is repeated eliminating the xylene from the charge and from the trap in step (a). A transparent, hard, flexible and impact resistant film is obtained. The film is resistant to water, 5% caustic solution, methanol and detergents.

*Example VII*

A 5-liter flask is equipped as in Example I(a). Fourteen-hundred grams of a copolymer comprised of about 80% by weight of styrene and, correspondingly, a theoretical 20% by weight of allyl alcohol, but having an actual hydroxyl group content of about 4.3% by weight, are charged thereto together with 730 grams of soya fatty acids and 140 grams of xylene. The mixture is gradually heated to reflux (circa 160° C.) and then to about 225° C. over a period of about 1 hour. The temperature is maintained at 225±5° C. until about 63 ml. of water are collected in the trap. A fused esterified resin wherein substantially 75% of the hydroxyl groups have been esterified is obtained. The product is adjusted to an acid number of about 12 with further soya fatty acids. An oil-in-water emulsion is prepared and a baked film cast therefrom; according to the procedure set forth in Example V, steps (b), (c) and (d) respectively. A transparent, hard, flexible and impact resistant film is obtained. The film is resistant to water, 5% caustic solution, methanol and detergents.

*Example VIII*

(a) A 5-liter flask is equipped as in Example I(a). Fourteen-hundred grams of a copolymer comprised of about 60% by weight of styrene and, correspondingly, a theoretical 40% by weight of allyl alcohol, but having an actual hydroxyl group content of about 7.5% by weight, are charged thereto together with 1280 grams of tall oil fatty acids and 140 grams of xylene. The mixture is gradually heated to reflux (circa 160° C.) and then to about 225° C. over a period of about 1 hour and is maintained thereat for an additional 2 hours. A fused esterified resin wherein approximately 70% of the hydroxyl groups are esterified is obtained in conjunction with sufficient tall oil fatty acids to provide an acid number of about 3.

(b) Five-hundred grams of the product of (a) are charged to a one-half gallon stainless steel kettle equipped with a close-fitting anchor stirrer. The batch is heated to about 40° C. and agitation is started. After about 1 minute, 410 ml. of an aqueous ammonium hydroxide solution containing about 0.75% ammonia by weight are titrated into the stirred viscous mass over a period of about 2 hours, during which time inversion from water-in-oil emulsion to an oil-in-water emulsion occurs. Finally, this oil-in-water emulsion is titrated into 85 grams of an aminoplast emulsion prepared as in Example I(b). The batch temperature is maintained at about 40° C. throughout. The product is a stable oil-in-water emulsion containing about 50% solids by weight.

(c) A baked film is prepared from the oil-in-water emulsion prepared in (b) employing the procedure set forth in Example I(d). A transparent, hard, flexible and impact resistant film is obtained. The film is resistant to water, 5% caustic solution, methanol and detergents.

The primary resinous components of the surface coating compositions of this invention are copolymers of from 60–85% by weight of a styrene monomer and, correspondingly, from 40–15% by weight of an ethylenically unsaturated alcohol wherein from 50–75% of the hydroxyl groups thereof are esterified with a fatty acid. The actual hydroxyl group content of the aforesaid copolymers (before esterification) will not always conform to the theoretical content calculated from the relative proportions of styrene monomer and ethylenically unsaturated alcohol, due to possible destruction of hydroxyl groups during copolymerization. In general, however, copolymers containing from about 4.0 to 7.5% hydroxyl groups by weight are within the scope of this invention. The styrene monomer moiety of said copolymer may be styrene or a ring-substituted styrene in which the substituents are 1–4 carbon atom alkyl groups or chlorine atoms. Examples of such ring-substituted styrenes include the ortho-, meta- and para-, methyl, ethyl, butyl, etc. monoalkyl styrenes; 2,3- and 2,4-dimethyl and diethyl styrenes; mono, di- and tri-chlorostyrenes; alkylchlorostyrenes such as 2-methyl-4-chlorostyrene, etc. Mixtures of two or more of such styrene monomer moieties may be present. The ethylenically unsaturated alcohol moiety may be allyl alcohol, methallyl alcohol, or a mixture thereof. For the purposes of brevity and simplicity of discussion, the entire class of copolymers set forth in this paragraph shall hereinafter be referred to simply as styrene-allyl alcohol copolymers.

The styrene-allyl alcohol copolymers may be prepared in several ways. However, it is most desirable to copolymerize the styrene and allyl alcohol components in a substantially oxygen-free system, thus minimizing the oxidative loss of hydroxyl groups (see U.S. 2,894,938). It is especially preferred to employ styrene-allyl alcohol copolymers containing a relatively uniform distribution of hydroxyl groups. It has been found that such copolymers provide surface coating films possessed of uniform properties; i.e., films free of surface areas deficient in one or more of the important properties such as, e.g., solvent resistance, adhesion, etc. These latter copolymers may be prepared as taught in copending application, S.N. 771,177, filed November 3, 1958.

The fatty acids with which the aforementioned styrene-allyl alcohol copolymers are esterified are those containing from 10–24 carbon atoms. Either saturated or unsaturated fatty acids may be employed. Examples of suitable unsaturated fatty acids include $\Delta^{9,10}$-decylenic acid, $\Delta^{9,10}$-dodecylenic acid, palmitoleic acid, oleic acid, ricinoleic acid, petroselinic acid, vaccenic acid, linoleic acid, linolenic acid, eleostearic acid, licanic acid, parinaric acid, tariric acid, gadoleic acid, arachidonic acid, cetoleic acid, erucic acid, selacholeic acid, etc. Mixtures of such fatty acids may also be employed. Especially preferred are the mixtures of such unsaturated fatty acids as obtained by the hydrolysis of drying and semi-drying oils such as acorn oil, beechnut oil, brazil nut oil, chaulmoogra oil, corn oil, cottonseed oil, croton oil, hemp seed oil, linseed oil, oiticica oil, perilla oil, poppy seed oil, sesame oil, soybean oil, safflower oil, sunflower oil, tall oil, tung oil, walnut oil, dehydrated castor oil, etc. Examples of suitable saturated fatty acids include capric acid, lauric acid, myristic acid, palmitic acid, stearic acid, arachidic acid, behenic acid, lignoceric acid, etc. Mixtures of such fatty acids may also be employed. Especially preferred among the saturated fatty acids are the mixtures thereof as obtained by the hydrolysis of non-drying oils such as coconut oil, babassu oil, palm oil, olive oil, castor oil, peanut oil, rape oil, etc. If desired, mixtures of such fatty acids, saturated or unsaturated, may be employed. Bodied fatty acids, i.e., partially polymerized fatty acids, may also be employed, in whole or in part, if desired.

The esterified resins are prepared by co-reacting a fatty acid and a styrene-allyl alcohol copolymer until from 50–75% of the hydroxyl groups of the copolymer are esterified. This may be accomplished by employing a proportion of fatty acid substantially stoichiometrically equivalent to the proportion of hydroxyl groups desired to be esterified. The necessary proportions may be readily determined by a chemist from quantitative analysis data expressed in milliequivalents of carboxyl and hydroxyl groups per unit weight of fatty acid and styrene-allyl alcohol copolymer, respectively.

The subsequent emulsification of these esterified copolymers requires the presence of a free fatty acid, either saturated or unsaturated of the species above set forth in a proportion such that a mixture of the esterified copolymer and the free fatty acid would have an acid number of from about 2–12. If desired, this requirement may be satisfied by adding a further quantity of an unsaturated, or saturated, fatty acid to the esterified copolymer prepared supra prior to emulsification. Alternatively, an equivalent amount of an amino salt of a fatty acid may be added during the emulsification. However, in another embodiment, esterified copolymers having predetermined acid numbers may be prepared directly by employing a carefully calculated stoichiometric excess of the fatty acid in the esterification reaction and terminating the reaction after the desired proportion of hydroxyl groups of the styrene-allyl alcohol copolymer have been esterified. The foregoing alternatives may advantageously be combined to obtain desired results. Thus, the esterified copolymer may be acidified with saturated fatty acids alone, with unsaturated fatty acids alone, with mixtures of both, or the copolymer may be esterified directly to one predetermined acid number and then adjusted to another, within the above range, with a dissimilar fatty acid.

Esterified copolymers having an acid number above about 12 are undesirable since, upon emulsification, they cause excessive foaming and thickening of the emulsion. Also, films cast therefrom have decreased resistance to water. It has been found that those esterified copolymers having acid numbers of from about 4–6 provide an optimum balance between the critical considerations of stability of emulsions preparable therefrom and the quality of the films cast from such emulsions.

To return to the esterification reaction in detail, said reaction may be effected to the desired degree of esterification at temperatures of from 160° C. to about 225° C. without significant destruction of hydroxyl groups. However, prolonged heating at higher temperatures is apt to result in a loss of hydroxyl groups from the copolymer. Thus, it is preferred to avoid the use of reaction temperatures above about 225° C., although temperatures of up to about 325° C. may be employed if desired. The reaction may be terminated short of completion merely by ceasing to heat, by quenching, or by other conventional techniques. The esterification may be conducted in the presence of an inert hydrocarbon solvent such as xylene, mineral spirits, etc. However, the use of solvent is optional since the esterification proceeds satisfactorily in the absence of solvent. If a limited proportion of solvent is employed, e.g., up to about 10% by weight, it is not necessary to remove same before emulsification. In any event, excess solvent should be removed by, e.g., evaporation prior to emulsification.

The aminoplast components of the surface coating compositions of this invention are the etherified reaction products of at least 3 molar proportions of a monohydric alcohol containing from 3–6 carbon atoms and a condensation product of from 3–6 molar proportions of formaldehyde and 1 molar proportion of an aminotriazine. The aminotriazine moiety of said aminoplast may be (1) melamine, (2) an N-substituted melamine wherein from 1–3 of the amino hydrogen atoms are replaced with alkyl, cycloalkyl, aryl, or acyl groups containing from 1–6 carbon atoms, or (3) a guanamine compound corresponding to the general formula:

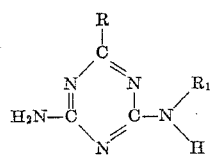

wherein R is either hydrogen or a hydrocarbon radical containing from 1–7 carbon atoms and $R_1$ is either hydrogen or an alkyl, aryl or acyl group containing from 1–6 carbon atoms. Thus, alkylated formaldehyde condensates of such aminotriazines as, for example, melamine, 2,4-diamino-6-methylamino-s-triazine, 2,4-diamino-6-dimethylamino-s-triazine, 2,4-diamino-6-phenylamino-s-triazine, 2,4 - diamino - 6 - acetylamino-s-triazine, 2,4-diamino-6-butylamino-s-triazine, 2-amino-4,-6-di(cyclohexylamino)-s-triazine, 2-amino-4,6-di(methylamino)-s-triazine, 2-amino-4-methylamino-6-dimethylamino-s-triazine, 2,4,6 - tri(methylamino)-s-triazine, 2,4,6-tri(cyclohexylamino)-s-triazine, 2-amino-4-butylamino-6-methylamino-s-triazine, guanamine, N-methyl guanamine, N-butyl- guanamine, N-phenyl guanamine, N-acetyl guanamine, benzoguanamine, N-methyl benzoguanamine, N-acetyl benzoguanamine, phenylacetoguanamine, N-methyl phenylacetoguanamine, N-acetyl acetoguanamine, etc., may be employed as in the preceding examples with equivalent results.

The etherified aminoplasts employed in the invention are prepared by heating the aminotriazine and the formaldehyde under alkaline conditions, e.g., at a pH of 8.5–10.5, in a suitable solvent such as water, a 1–6 carbon atom monohydric alcohol or a water-alcohol mixture. The minimum quantity of formaldehyde employed is at least 3 mols per mol of aminotriazine, but preferably the formaldehyde is employed in a quantity sufficient to react with each of the reactive hydrogen atoms contained in the N-substituted melamine. In calculating the quantity of formaldehyde to be employed, an aminotriazine such as N,N'-dicyclohexylmelamine contains 4 reactive hydrogen atoms and N,N',N'' - tricyclohexylmelamine contains 3 reactive hydrogen atoms. Such aminotriazines may be prepared by the method disclosed in U.S. Patent 2,361,823.

The etherified resins are prepared by heating the condensates of the aminotriazines and formaldehyde with at least 2 mols, per mol of aminotriazine, of a monohydric alcohol containing 3–6 carbon atoms under acid conditions, e.g., at a pH of about 5.5–7.0. During this reaction, the condensation product is both etherified and polymerized. Thus, the alcohol functions as both a reactant and as a solvent for the reaction. Preferably, the reaction is carried out under reflux conditions (at either atmospheric or reduced pressure) so that water may be removed from the reaction system by azeotropic distillation. To maintain the minimum quantity of alcohol required in the reaction system when operating under reflux conditions, it is necessary to (1) return the distilled alcohol to the reaction system, or (2) add alcohol to the reaction system as makeup, or (3) initially charge a large excess of alcohol to the reaction. Essentially, any 3–6 carbon atom monohydric alcohol such as isopropanol, butanol or hexanol may be employed in the etherification reaction. The alcohol employed will be influenced to a large degree by the use that is to be made of the resin. In a preferred embodiment, n-butanol or especially isobutanol are used for this purpose. When isobutanol is employed as the etherifying alcohol, the pH of the system during the etherification reaction should be maintained within the limits of about 5.8–7.0 or preferably 6.0–6.5. After the etherification reaction is complete, the resin solutions may be concentrated to the desired solids level or recovered in solvent-free form by removing the solvent alcohol by vacuum distillation.

In a preferred embodiment, the etherified aminotriazineformaldehyde condensates employed are modified with up to about 1 mol of toluene sulfonamide per mol of aminotriazine, charged to the aminotriazine and formaldehyde reaction mixture prior to, or during, condensation.

The surface coating compositions of this invention are stable oil-in-water emulsions comprised essentially of the aforementioned esterified copolymers and aminoplasts, water soluble amino salts of fatty acids and water, all in critical proportions as hereinafter set forth. The water-soluble amino salts of fatty acids are formed during the emulsification step by the neutralization of the free fatty acids associated with the resinous components with at least a stoichiometrically equivalent proportion of ammonia or of a soap-forming amine.

When a soap-forming amine is employed, it should satisfy two requirements. First, it should form water-soluble salts in conjunction with the fatty acids present. Secondly, it should be capable of being volatilized at the temperatures employed in the cure of films cast from the final surface coating compositions. Thus, ammonia, methylamine or ethylamine should be used when manufacturing air drying or low temperature baking compositions. For baking compositions, amines boiling at temperatures of up to about 450° C. may be employed. Examples of suitable soap-forming amines include mono-, di- and tri-alkyl amines such as ethylamine, diethylamine, triethylamine, n-propylamine, n-butylamine, tri-n-butylamine, n-hexylamine, etc.; mono-, di- and tri-alkanol amines such as ethanolamine, diethanolamine, triethanolamine, 2-methyl-2-amino propanol, etc., morpholine; etc.

Alternatively, equivalent surface coating compositions may be prepared employing the corresponding pre-prepared amine salts of fatty acids. Thus, non-acidified esterified copolymers or aminoplasts, or those associated with less than the desired proportion of fatty acids, may be emulsified directly. Proportions consistent with the principles herein set forth are used.

Returning to the emulsification procedure in greater detail, the emulsification of the esterified copolymer will be considered first. The esterified copolymer is adjusted, if necessary, to the desired acid number with fatty acid and, subsequently, the ammonia, or amine, and water are slowly charged thereto amid continuous stirring. It is generally most convenient to charge these latter components as an aqueous solution of the ammonia or amine, although the ammonia, or amine, may be charged separately followed by titration of water. The rate at which this aqueous phase is charged should be controlled such that the viscosity within the stirred mixture provides sufficient mechanical shear to form, initially, a smooth water-in-oil emulsion. Such techniques are well-known to those skilled in the art of emulsification. The aqueous phase is charged at a controlled rate to maintain shear until inversion from the water-in-oil emulsion to an oil-in-water emulsion is complete. Any remaining water may then be added rapidly, stirring the final emulsion until homogeneous. The entire operation may require anywhere from 1–5 hours. A batch temperature of from 10–100° C. is maintained throughout.

In an alternative, and preferred, procedure for emulsifying the esterified copolymer, from 40–60% of the total quantity of ammonia, or amine, to be employed may be charged initially in the form of a dilute aqueous solution and the batch stirred into a homogeneous, viscous water-in-oil emulsion. Then the remaining ammonia, or soap-forming amine, and water may be charged at a slow rate consistent with the principle set forth in the preceding paragraph until after inversion has occurred.

Turning now to the emulsification of the aminoplast components heretofore described, said components need not be recovered before use from the solvent system in which they were prepared. Whether employed in solution form or as solids, the emulsification procedure will be the same. The aminoplast is combined with from 5–35% by weight, based upon aminoplast solids, of a fatty acid of the class heretofore described, with a proportion of ammonia, or an amine of the class heretofore described, at least stoichiometrically equivalent to said fatty acid, and with sufficient water to adjust the total solids content to from 20–65% by weight. This mixture is continuously agitated, maintaining a batch temperature of from 10–100° C. until an oil-in-water emulsion is obtained. In various embodiments; the ammonia, or amine, may be added gradually in the form of an aqueous solution to a mixture of the aminoplast and fatty acid; the ammonia, or amine, may be charged en masse to a mixture of aminoplast and fatty acid, water being slowly titrated into the resulting mixture; etc.

Finally, the esterified copolymer emulsion and the aminoplast emulsion are combined in proportions equivalent to from about 2–30 parts by weight of aminoplast solids per 100 parts by weight of esterified copolymer solids. Such combination is effected by slowly adding the esterified copolymer emulsion to the aminoplast emulsion amid continuous agitation and continuing such agitation until homogeneous. The product is a stable oil-in-water emulsion.

Sufficient water is added, either during the emulsification of each of the resinous components or during the subsequent combination of the two oil-in-water emulsion systems to produce surface coating compositions containing from about 10–60% of esterified copolymer and aminoplast solids by weight. Those emulsions containing from about 40–60% solids by weight are preferred for practical reasons; e.g., the economic unfeasibility of shipping larger proportions of water than is necessary, etc. If more dilute emulsions are desired for particular applications, further quantities of water may be blended in at the time of use without danger of demulsification or of flocculation.

The oil-in-water emulsions of this invention do not flocculate, even after storage under normal conditions for periods in excess of 6 months. Such stability is obtained even though conventional emulsifiers, beyond these formed during the emulsion, have not been used. Thus, these stable emulsions contain a fugitive emulsifier which is volatilized upon curing of films cast therefrom, yielding more uniform and resistant films. In fact, it has been found that the presence of an additional emulsifier actually leads to flocculation. However, these latter emulsions are stable to a degree, since the flocculation is reversible, the original oil-in-water emulsion being restored by shaking or mixing. Therefore, while not preferred, a minor proportion, i.e., from 0.5–6% by weight, based upon the esterified copolymer, of a conventional anionic or non-ionic emulsifying agent may be employed if desired. Such emulsifiers are well-known to those skilled in the art. The most recent listing of such emulsifiers is found in a series of papers entitled "Synthetic Detergents and Emulsifiers—Up to Date III, 1955," written by John W. McCutcheon and published in the July, August, September and October 1955 issues of "Soap and Chemical Specialties." Bound reprints of these papers are available from John W. McCutcheon, Inc., 475 Fifth Avenue, New York 17, New York.

The oil-in-water emulsions of this invention are useful alone or in co-mixture with other resinous emulsions or latices of, e.g., vinyl or vinylidene polymers such as polyvinyl acetate, vinyl acetate-maleic anhydride copolymers, styrene-butadiene copolymers, styrene-acrylate ester copolymers, acrylate or methacrylate homopolymers or copolymers. Small quantities of a conventional drier such as cobalt naphthenate, etc. may be employed, if desired, to improve the drying characteristics of films cast therefrom. They are useful alone, or modified as above, in oven-baked industrial primers, topcoats, varnishes, inks, wood sealers, etc., employed in the finishing of such commercial products as automobiles, appliances, furniture, architectural structures, etc. They may be modified before use by incorporating therein conventional additives such as pigments, fillers, stabilizers, plasticizers, etc. Such additives may be incorporated into the ester or aminoplast either before or after emulsification.

Films cast from the oil-in-water emulsions of this invention exhibit superior adhesion to most surfaces, including metals, glass, wood, masonry, plaster, textiles, other resins, asphaltous matrixes, etc. They possess an unusually attractive balance between the properties of flexibility and hardness, as well as being resistant to impact and to common household and industrial solvents; e.g., water, ammonium hydroxide, dilute caustic solutions, vinegar, alcohol, soap, detergents, etc.

This application is a continuation in part of copending application Serial Number 13,697, filed March 9, 1960.

It is obvious that many variations may be made in the products and processses set forth above without departing from the spirit and scope of this invention.

What is claimed is:

1. A stable non-flocculating oil-in-water emulsion comprising (a) 100 parts of a fatty acid ester of a copolymer of an ethylenically unsaturated alcohol and a styrene monomer, (b) from 2–30 parts by weight of an etherified aminoplast, (c) an emulsifier consisting of an amino salt of a fatty acid present in a total molar proportion equivalent to (1) the molar proportion of the corresponding free fatty acid which would theoretically be required to provide an acid number of from about 2–12 in co-mixture with said esterified copolymer plus (2) a molar proportion of said free fatty acid equivalent to from 5–25% by weight of said etherified aminoplast and (d) from 65–900 parts by weight of water; said esterified copolymer being a copolymer of an ethylenically unsaturated alcohol selected from the group consisting of allyl alcohol, methallyl alcohol and mixtures thereof and a styrene monomer selected from the group consisting of styrene, ring-substituted mono- and di-, alkyl-, chloro- and chloroalkyl-styrenes and mixtures thereof having an initial hydroxyl group content, before esterification, of from about 4–7.5% by weight, from 50–75% of said hydroxyl groups being esterified with fatty acid selected from the group consisting of saturated and unsaturated fatty acids containing from 10–24 carbon atoms and mixtures thereof as obtained by the hydrolysis of drying, semi-drying and non-drying oils; said etherified aminoplast being a condensation product of (1) 1 molar proportion of an aminotriazine and (2) from 3–6 molar proportions of formaldehyde etherified with (3) at least 2 molar proportions of a 3–6 carbon atom aliphatic alcohol and modified with (4) from 0–1 molar proportion of toluene sulfonamide; said aminotriazine being selected from the group consisting of (I) melamine, (II) N-substituted melamines wherein not more than 3 amino hydrogens are substituted with radicals independently selected from the group consisting of alkyl (aryl and acyl groups containing from 1-6 carbon atoms, and (III) guanamine compounds corresponding to the general formula:

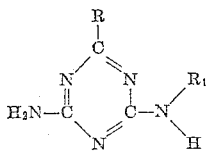

wherein R is a radical selected from the group consisting of hydrogen and hydrocarbon groups containing from 1-7 carbon atoms and $R_1$ is a radical selected from the group consisting of hydrogen and alkyl, aryl and acyl groups containing from 1-6 carbon atoms; said amino salt of a fatty acid being a salt of an amino compound selected from the group consisting of ammonia and fugitive soap-forming amines and a fatty acid selected from the group consisting of saturated and unsaturated fatty acids containing from 10-24 carbon atoms and mixtures thereof as obtained by the hydrolysis of drying, semi-drying and non-drying oils; and fugitive soap-forming amines being defined as those amines which form water-soluble soaps in combination with said fatty acids and which have atmospheric boiling points of up to 450° C.

2. A stable non-flocculating oil-in-water emulsion as in claim 1 wherein the esterified copolymer is a soya fatty acid ester of a copolymer of styrene and allyl alcohol having a hydroxyl group content of about 6.4% by weight before esterification.

3. A stable non-flocculating oil-in-water emulsion as in claim 1 wherein the etherified aminoplast is a butyl ether of a melamine formaldehyde condensate.

4. A stable non-flocculating oil-in-water emulsion as in claim 1 wherein the esterified copolymer is a soya fatty acid ester of a copolymer of styrene and allyl alcohol having a hydroxyl group content of about 6.4% by weight before esterification and the etherified aminoplast is a butyl ether of a melamine-formaldehyde condensate.

5. A stable non-flocculating oil-in-water emulsion as in claim 4 wherein the amino salt of a fatty acid is an ammonium salt of soya fatty acids.

6. A stable non-flocculating oil-in-water emulsion as in claim 5 wherein the ammonium salt of soya fatty acids is present in a molar proportion equivalent to the molar proportion of soya fatty acids which would theoretically be required to provide an acid number of from about 4-6 in co-mixture with the esterified copolymer.

7. A process for preparing a stable non-flocculating oil-in-water emulsion which comprises (a) esterifying a copolymer of an ethylenically unsaturated alcohol and a styrene monomer having a hydroxyl group content of from about 4-7% by weight with fatty acid at a temperature of from 160-225° C. until from 50-75% of said hydroxyl groups are esterified, employing an excess of said fatty acid above the stoichiometric proportion thereof necessary to effect the desired degree of esterification so as to provide an acid number of from 2-12, (b) slowly charging thereto 65-900 parts by weight of water per 100 parts by weight of esterified copolymer together with a proportion of an amino compound selected from the group consisting of ammonia and fugitive soap-forming amines at least stoichiometrically equivalent to the proportion of free fatty acid associated with said esterified copolymer while (c) continuously stirring the mixture at a batch temperature of from about 10-100° C. until an oil-in-water esterified copolymer emulsion is formed, (d) separately combining (1) an etherified aminoplast with (2) from 5-35% by weight, based upon aminoplast solids, of a fatty acid, (3) an amino compound selected from the group consisting of ammonia and fugitive soap-forming amines in a proportion at least stoichiometrically equivalent to said fatty acid and (4) water in a proportion to provide a total solids content of from 20-65% by weight and stirring the mixture at a batch temperature of from about 10-100° C. until an oil-in-water aminoplast emulsion is formed and (e) subsequently combining said oil-in-water aminoplast emulsion and said oil-in-water esterified copolymer emulsion in the proportions of from 2-30 parts by weight of aminoplast solids per 100 parts by weight of esterified copolymer solids by slowly adding said oil-in-water esterified copolymer emulsion to said oil-in-water aminoplast emulsion amid stirring and continuing stirring until the mixture is homogeneous; the ethylenically unsaturated alcohol moiety of said copolymer being selected from the group consisting of allyl alcohol, methallyl alcohol and mixtures thereof and the styrene monomer moiety of said copolymer being selected from the group consisting of styrene, ring-substituted mono- and di- alkyl-, chloro- and chloroalkyl-styrenes and mixtures thereof; said etherified aminoplast being a condensation product of (1) 1 molar proportion of an aminotriazine and (2) from 3-6 molar proportions of formaldehyde etherified with (3) at least 2 molar proportions of a 3-6 carbon atom aliphatic alcohol and modified with (4) from 0-1 molar proportion of toluene sulfonamide; said aminotriazine being selected from the group consisting of (I) melamine, (II) N-substituted melamines wherein not more than 3 amino hydrogens are substituted with radicals independently selected from the group consisting of alkyl, aryl and acyl groups containing from 1-6 carbon atoms and (III) guanamine compounds corresponding to the general formula:

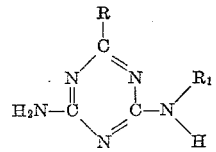

wherein R is a radical selected from the group consisting of hydrogen and hydrocarbon groups containing from 1-7 carbon atoms and $R_1$ is a radical selected from the group consisting of hydrogen and alkyl, aryl and acyl groups containing from 1-6 carbon atoms; said fatty acid being selected from the group consisting of saturated and unsaturated fatty acids containing from 10-24 carbon atoms and mixtures thereof as obtained by the hydrolysis of drying, semi-drying and non-drying oils; said fugitive soap-forming amines being defined as those amines which form water-soluble soaps in combination with said fatty acids and which have atmospheric boiling points of up to 450° C.

8. A process for preparing a stable non-flocculating oil-in-water emulsion as in claim 7 wherein approximately 40-60% of said amino compound is initially charged in step (b) in the form of an aqueous solution, this mixture being stirred until homogeneous and, subsequently, slowly charging the remaining amino compound and water while continuously starring until the oil-in-water esterified copolymer emulsion is formed.

9. A process for preparing a stable non-flocculating oil-in-water emulsion as in claim 7 wherein the amino compound is ammonia.

10. A process for preparing a stable non-flocculating oil-in-water emulsion as in claim 7 wherein the copolymer is a copolymer of styrene and allyl alcohol containing from about 4-7.5% hydroxyl groups by weight and the unsaturated fatty acid is soya fatty acids.

11. A process for preparing a stable non-flocculating oil-in-water emulsion as in claim 8 wherein the etherified aminoplast is a butyl ether of a melamine-formaldehyde condensate.

12. A process for preparing a stable non-flocculating oil-in-water emulsion which comprises (a) esterifying a copolymer of an ethylenically unsaturated alcohol and a styrene monomer having a hydroxyl group content of from about 4-7.5% by weight with fatty acid at a temperation of from 160-225° C. until from 50-75% of said hydroxyl groups are esterified, employing an excess of said fatty acid above the stoichiometric proportion thereof necessary to effect the desired degree of esterification so as to provide a predetermined acid number of less than 12, (b) adjusting said mixture to a higher acid number of from 2–12 with a second proportion of fatty acid, (c) slowly charging thereto from 65–900 parts by weight of water per 100 parts by weight of esterified copolymer together with an amino compound selected from the group consisting of ammonia and fugitive soap-forming amines in a proportion at least stoichiometrically equivalent to the total proportion of free fatty acid while (d) continuously stirring the mixture at a batch temperature of from about 10–100° C. until an oil-in-water esterified copolymer emulsion is formed, (e) separately combining (1) an etherified aminoplast with (2) from 5–35% by weight, based upon aminoplast solids, of a fatty acid, (3) an amino compound selected from the group consisting of ammonia and fugitive soap-forming amines in a proportion at least stoichiometrically equivalent to said fatty acid and (4) water in a proportion to provide a total solids content of from 20–65% by weight and stirring the mixture at a batch temperature of from about 10–100° C. until an oil-in-water aminoplast emulsion is formed and (f) subsequently combining said oil-in-water aminoplast emulsion and said oil-in-water esterified copolymer emulsion in the proportions of from 2–30 parts by weight of aminoplast solids per 100 parts by weight of esterified copolymer solids by slowly adding said oil-in-water esterified copolymer emulsion to said oil-in-water aminoplast emulsion amid stirring and continuing stirring until the mixture is homogeneous; the ethylenically unsaturated alcohol moiety of said copolymer being selected from the group consisting of allyl alcohol, methallyl alcohol and mixtures thereof and the styrene monomer moiety of said copolymer being selected from the group consisting of styrene, ring-substituted mono- and di-, alkyl-, chloro- and chloroalkyl-styrenes and mixtures thereof; said etherified aminoplast being a condensation product of (1) 1 molar proportion of an aminotriazine and (2) from 3–6 molar proportions of formaldehyde etherified with (3) at least 2 molar proportions of a 3–6 carbon atom aliphatic alcohol and modified with (4) from 0–1 molar proportion of toluene sulfonamide; said aminotriazine being selected from the group consisting of (I) melamine, (II) N-substituted melamines wherein not more than 3 amino hydrogens are substituted with radicals independently selected from the group consisting of alkyl, aryl and acyl groups containing from 1–6 carbon atoms and (III) guanamine compounds corresponding to the general formula:

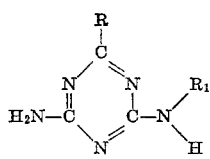

wherein R is a radical selected from the group consisting of hydrogen and hydrocarbon groups containing from 1–7 carbon atoms and $R_1$ is a radical selected from the group consisting of hydrogen and alkyl, aryl and acyl groups containing from 1–6 carbon atoms; said fatty acid being selected from the group consisting of saturated and unsaturated fatty acids containing from 10–24 carbon atoms and mixtures thereof as obtained by the hydrolysis of drying, semi-drying and non-drying oils; said fugitive soap-forming amines being defined as those amines which form water soluble soaps in combination with said fatty acids and which have atmospheric boiling points of up to 450° C.

13. A process for preparing a stable non-flocculating oil-in-water emulsion as in claim 12 wherein approximately 40–60% of said amino compound is initially charged in step (b) in the form of an aqueous solution, this mixture being stirred until homogeneous and, subsequently, slowly charging the remaining amino compound and water while continuously stirring until an oil-in-water esterified copolymer emulsion is formed.

14. A process for preparing a stable non-flocculating oil-in-water emulsion as in claim 12 wherein the amino compound is ammonia.

15. A process for preparing a stable non-flocculating oil-in-water emulsion which comprises (a) esterifying a copolymer of an ethylenically unsaturated alcohol and a styrene monomer having a hydroxyl group content of from 4–7.5% by weight with fatty acid at a temperature of from 160–225° C. until from 50–75% of said hydroxyl groups are esterified, employing a proportion of fatty acid substantially stoichiometrically equivalent to the proportion of hydroxyl groups desired to be esterified, (b) adjusting the esterified copolymer to an acid number of from 2–12 with a second proportion of fatty acid, (c) slowly charging thereto from 65–900 parts by weight of water per 100 parts by weight of esterified copolymer together with an amino compound selected from the group consisting of ammonia and fugitive soap-forming amines in a proportion at least stoichiometrically equivalent to said free fatty acid while (d) continuously stirring the mixture at a batch temperature of from about 10–100° C. until an oil-in-water esterified copolymer emulsion is formed; (e) separately combining (1) an etherified aminoplast with (2) from 5–35% by weight, based upon aminoplast solids, of a fatty acid, (3) an amino compound selected from the group consisting of ammonia and fugitive soap-forming amines in a proportion at least stoichiometrically equivalent to said fatty acid and (4) water in a proportion to provide a total solids content of from 20–65% by weight and stirring the mixture at a batch temperature of from about 10–100° C. until an oil-in-water aminoplast emulsion is formed and (f) subsequently combining said oil-in-water aminoplast emulsion and said oil-in-water esterified copolymer emulsion in the proportions of from 2–30 parts by weight of aminoplast solids per 100 parts by weight of esterified copolymer solids by slowly adding said oil-in-water esterified copolymer emulsion to said oil-in-water aminoplast emulsion amid stirring and continuing stirring until the mixture is homogeneous; the ethylenically unsaturated alcohol moiety of said copolymer being selected from the group consisting of allyl alcohol, methallyl alcohol and mixtures thereof and the styrene monomer moiety of said copolymer being selected from the group consisting of styrene, ring-substituted mono- and di-, alkyl-, chloro- and chloroalkyl-styrenes and mixtures thereof; said etherified aminoplast being a condensation product of (1) 1 molar porportion of an aminotriazine and (2) from 3–6 molar proportions of formaldehyde etherified with (3) at least 2 molar proportions of a 3–6 carbon atom aliphatic alcohol and modified with (4) from 0–1 molar proportion of toluene sulfonamide; said aminotriazine being selected from the group consisting of (I) melamine, (II) N-substituted melamines wherein not more than 3 amino hydrogens are substituted with radicals independently selected from the group consisting of alkyl, aryl and acyl groups containing from 1–6 carbon atoms and (III) guanamine compounds corresponding to the general formula:

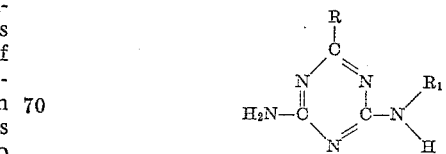

wherein R is a radical selected from the group consisting of hydrogen and hydrocarbon groups containing from 1–7 carbon atoms and $R_1$ is a radical selected from the group consisting of hydrogen and alkyl, aryl and acyl groups containing from 1–6 carbon atoms; said fatty acid being selected from the group consisting of saturated and unsaturated fatty acids containing from 10–24 carbon atoms and mixtures thereof as obtained by the hydrolysis of drying, semi-drying and non-drying oils; said fugitive soap-forming amines being defined as those amines which form water soluble soaps in combination with said fatty acids and which have atmospheric boiling points of up to 450° C.

16. A process for preparing a stable non-flocculating oil-in-water emulsion as in claim 15 wherein approximately 40–60% of said amino compound is initially charged in step (b) in the form of an aqueous solution, this mixture being stirred until homogeneous and, subsequently, slowly charging the remaining amino compound and water while continuously stirring until an oil-in-water emulsion is formed.

17. A process for preparing a stable non-flocculating oil-in-water emulsion as in claim 15 wherein the amino compound is ammonia.

References Cited in the file of this patent

UNITED STATES PATENTS

| | | |
|---|---|---|
| 2,865,871 | Johnson et al. | Dec. 23, 1958 |
| 2,894,938 | Chapin et al. | July 14, 1959 |
| 2,897,174 | Chapin et al. | July 28, 1959 |
| 2,915,486 | Shelley | Dec. 1, 1959 |

UNITED STATES PATENT OFFICE
CERTIFICATE OF CORRECTION

Patent No. 3,069,368            December 18, 1962

Robert J. Carney et al.

It is hereby certified that error appears in the above numbered patent requiring correction and that the said Letters Patent should read as corrected below.

Column 12, line 40, for "acyl" read -- aryl --; line 56, for "starring" read -- stirring --; lines 74 and 75, for "temperation" read -- temperature --.

Signed and sealed this 25th day of June 1963.

(SEAL)
Attest:

ERNEST W. SWIDER
Attesting Officer

DAVID L. LADD
Commissioner of Patents